(12) United States Patent
Hoffmann et al.

(10) Patent No.: US 10,337,153 B2
(45) Date of Patent: Jul. 2, 2019

(54) QUICK-CHANGE ATTACHMENT FOR MATERIAL TRANSFER VEHICLE

(71) Applicant: Roadtec, Inc., Chattanooga, TN (US)

(72) Inventors: John Eric Hoffmann, Signal Mountain, TN (US); Nathan Thomas Beckman, Signal Mountain, TN (US)

(73) Assignee: Roadtec, Inc., Chattanooga, TN (US)

( * ) Notice: Subject to any disclaimer, the term of this patent is extended or adjusted under 35 U.S.C. 154(b) by 0 days.

(21) Appl. No.: 15/984,574

(22) Filed: May 21, 2018

(65) Prior Publication Data

US 2018/0347123 A1   Dec. 6, 2018

Related U.S. Application Data

(60) Provisional application No. 62/513,593, filed on Jun. 1, 2017.

(51) Int. Cl.
| | |
|---|---|
| *E01C 19/00* | (2006.01) |
| *B65G 37/00* | (2006.01) |
| *B65G 41/00* | (2006.01) |
| *B65G 47/18* | (2006.01) |
| *B65G 67/02* | (2006.01) |
| *B65G 33/14* | (2006.01) |

(52) U.S. Cl.
CPC .............. *E01C 19/00* (2013.01); *B65G 37/00* (2013.01); *B65G 41/008* (2013.01); *B65G 47/18* (2013.01); *B65G 67/02* (2013.01); *B65G 33/14* (2013.01); *B65G 2201/042* (2013.01); *B65G 2207/14* (2013.01); *B65G 2812/013* (2013.01); *B65G 2812/0577* (2013.01); *E01C 2301/04* (2013.01)

(58) Field of Classification Search
CPC ....... E01C 19/00; B65G 37/00; B65G 41/008; B65G 47/18
USPC .......................................................... 198/522
See application file for complete search history.

(56) References Cited

U.S. PATENT DOCUMENTS

| | | | | |
|---|---|---|---|---|
| 3,479,755 | A * | 11/1969 | Schropp ................ | E02F 3/6481 172/784 |
| 3,537,243 | A * | 11/1970 | Bichel ................... | A01D 61/00 56/124 |
| 5,015,120 | A * | 5/1991 | Brock ..................... | B60P 1/38 404/108 |
| 5,867,972 | A * | 2/1999 | Laumann ............... | A01D 41/14 56/126 |
| 7,160,056 | B1 | 1/2007 | Hoffmann et al. | |

(Continued)

OTHER PUBLICATIONS

International Search Report and Written Opinion of counterpart PCT Application No. PCT/US18/33602 dated Aug. 21, 2018.

*Primary Examiner* — William R Harp
(74) *Attorney, Agent, or Firm* — Chambliss, Bahner & Stophel, P.C.

(57) ABSTRACT

A material transfer vehicle includes a loading conveyor and a loading component (such as a truck-receiving hopper component or a windrow pick-up component) that is adapted to be removably attached to the lower end of the loading conveyor. The loading conveyor has a right guide plate on the right side of the lower end and a left guide plate on the left side of the lower end. The loading component has a right guide bracket that is adapted to align with and engage the right guide plate of the loading conveyor, and a left guide bracket that is adapted to align with and engage the left guide plate of the loading conveyor.

12 Claims, 8 Drawing Sheets

(56) References Cited

U.S. PATENT DOCUMENTS

| | | |
|---|---|---|
| 7,267,519 B2 * | 9/2007 | Cresswell ............ A01C 15/003 198/313 |
| 2016/0176650 A1 | 6/2016 | Brown |
| 2017/0145644 A1 | 5/2017 | Petty et al. |
| 2018/0105116 A1 | 4/2018 | Neisen |
| 2018/0142427 A1 | 5/2018 | Tkachenko et al. |

* cited by examiner

QUICK-CHANGE ATTACHMENT FOR MATERIAL TRANSFER VEHICLE

CROSS-REFERENCE TO RELATED APPLICATION

This application claims the benefit of U.S. Provisional Patent Application No. 62/513,593 which was filed on Jun. 1, 2017.

FIELD OF THE INVENTION

This invention relates generally to material transfer vehicles, and more particularly, to interchangeable components of a material transfer vehicle that are adapted for receiving asphalt paving material.

BACKGROUND OF THE INVENTION

Asphalt paving material is comprised of an asphaltic binder and aggregates of various particle sizes, including both coarse and fine aggregate materials. Because the equipment needed to produce asphalt paving material is expensive and the space required extensive, asphalt paving material is typically produced in a production facility that is dedicated to such purpose. Consequently, it is frequently necessary to transport the asphalt paving material from its place of origin to an asphalt paving machine at a remote paving site. The asphalt paving material is usually transported in dump trucks to an asphalt paving machine or to a material transfer vehicle that completes the transfer to the asphalt paving machine.

An asphalt paving machine is a self-propelled vehicle that is driven by a wheeled or tracked drive system. In a common type of paving machine, an asphalt receiving hopper is located at the front end of the machine to receive asphalt paving material, and a slat-type hopper conveyor located below the asphalt receiving hopper transfers the asphalt paving material from the hopper to a distribution assembly comprising a transverse distributing auger that is mounted at the rear of the machine. The asphalt paving material is deposited onto and across the roadway or other surface to be paved by the distributing auger, and a floating screed located behind the distributing auger compacts the asphalt paving material to form an asphalt mat.

Sometimes, asphalt paving material is discharged directly from a delivery truck into the asphalt receiving hopper of the asphalt paving machine. A dump-type delivery truck is unloaded by raising the truck bed and allowing the asphalt paving material to slide down the bed into the receiving hopper. When the truck bed is raised, it should not come into contact with the receiving hopper and should not be carried by or ride on any portion of the paving machine. For smaller-capacity dump trucks, contact with the paver is not often a problem. However, such contact can be a problem when large tractor-semitrailer units are used as delivery vehicles, particularly when the truck bed is extended to its highest point. In addition, if a delivery truck contacts the paver so that a portion of the weight of the delivery truck is carried by the paver as the paving operation is carried out, the screed elevation may be changed, which will affect the smoothness of the finished asphalt mat.

When asphalt paving material is delivered to the paving machine by delivery trucks, it is frequently necessary for a series of delivery trucks to move into contact with the front end of the paving machine to serially discharge their loads into the paving machine's asphalt receiving hopper. This method of delivery requires multiple truck maneuvers that are often difficult to achieve without stopping the paving machine. However, when a paving machine stops and subsequently restarts, its floating screed will produce a dip in the asphalt mat (when the machine stops) and a bump (when it restarts). In addition, because a typical delivery truck carries more asphalt paving material than can be unloaded quickly into the receiving hopper of the asphalt paving machine, it is frequently necessary for the paving machine to push the truck in the paving direction as the truck is unloaded while paving proceeds. This may be difficult to manage when the paving machine is proceeding through intersections or operating on curved sections of the roadway. Furthermore, the ability of the paving machine operator to place a smooth mat on the roadway will be affected by the rate of feed of asphalt paving material to the paving machine. This requires planning for proper scheduling of delivery trucks and coordination with the asphalt production facility. However delays at the production facility or traffic encountered by the delivery trucks can thwart the efforts of the most careful planners. Consequently, because it is desirable to keep the paving machine moving at all times during an asphalt paving operation, and since delivery trucks must be unloaded as they are pushed along in the paving direction, it is frequently necessary to have delivery trucks queue up near the paving machine to ensure that a loaded truck is available to move quickly into unloading position as an unloaded truck is moved out of the way. This may result in heat losses in the asphalt paving material in the waiting trucks, which can affect the quality of the asphalt mat being created by the paving machine.

A delivery truck can also be used to deliver the asphalt paving material to a windrow on the roadway in front of the paver. If the delivery truck is a dump truck, the windrow is usually formed by a spreader box or a windrow blending unit. If a spreader box is used, it will be pulled behind the truck, and the truck bed raised to deposit the asphalt paving material into the box. As the truck moves forward, the asphalt paving material is uniformly metered out of the box onto the roadway. If a windrow blending unit is used, it will typically be attached to a small front-end loader, and the asphalt paving material dumped onto the existing roadway across the width of the truck bed. The windrow blending unit will fold the asphalt paving material into a windrow as the blending unit is pushed forward by the loader. A bottom-unloading truck may also be used to deposit asphalt paving material in the form of a windrow onto the roadway.

When asphalt paving material is deposited on the roadway in the form of a windrow, it may be picked up from the roadway surface by a windrow elevator that is attached to the front of the asphalt paving machine. However, because it is desirable to keep the paving machine moving at all times while the paving machine is being operated, the windrow method of delivery may still require delivery trucks queueing up near the paving machine to insure that a windrow of asphalt paving material is available as soon as it is needed by the paving machine. This may also result in heat losses in the asphalt paving material in the waiting windrows, which can affect the quality of the asphalt mat being created by the paving machine.

For all of the difficulties associated with the timely delivery of asphalt paving material by individual delivery trucks to a paving machine or in the form of windrows, material transfer vehicles have been used in recent years to transport asphalt paving material to an asphalt paving machine. One type of material transfer vehicle may be used to shuttle asphalt paving material between the delivery trucks or windrows and the asphalt paving machine. Yet another type of material transfer vehicle is adapted to move alongside the asphalt paving machine while being tethered to a delivery truck to allow for the transfer of asphalt paving material from a delivery truck to an asphalt paving machine without requiring either the delivery truck or the material transfer vehicle to make direct contact with the asphalt paving machine, thus reducing the time required for delivery truck maneuvers and reducing the risk that the paving machine will have to stop during the paving operation. Still other material transfer vehicles are equipped with windrow pick-up heads that can pick up a windrow of asphalt paving material that has been dumped on the roadway as the material transfer vehicle is moved into the windrow. These vehicles are adapted to move alongside an asphalt paving machine and transfer the asphalt paving material from the windrows into the receiving hopper of the asphalt paving machine.

Some material transfer vehicles, such as the Roadtec MTV-1100, the Roadtec SB-1500 and the Roadtec SB-2500, are self-propelled. Self-propelled material transfer vehicles may include a large-capacity truck-receiving hopper or a window pick-up head, and an inclined loading conveyor extending upwardly from the hopper or pick-up head. In self-propelled material transfer vehicles equipped with a truck-receiving hopper, a transversely oriented auger may be provided in the truck-receiving hopper to urge asphalt paving material onto the loading conveyor. The asphalt paving material is carried upwardly by the loading conveyor from the truck-receiving hopper or pick-up head and discharged off the elevated output end of the loading conveyor into a chute mounted on the lower end of a discharge conveyor, or into an intermediate surge bin that is sized to hold the entire load of a delivery truck. The discharge of asphalt paving material off the elevated output end of the loading conveyor so that it may fall under the influence of gravity into a chute or surge bin assists in preventing undesirable segregation of the various particulate components of the asphalt paving material by particle size.

Material transfer vehicles of the type that are equipped with a surge bin typically include an auger and a conveyor in the surge bin that are adapted to transfer the asphalt paving material to the discharge conveyor. The auger in the surge bin re-blends the asphalt paving material to eliminate particle size segregation that occurs as the material is transported. It also helps to keep the heat in the asphalt paving material evenly distributed throughout the entire load of material obtained from the delivery truck.

Discharge conveyors that are mounted on self-propelled material transfer vehicles with and without surge bins are generally pivotable about an essentially vertical axis so that the transfer vehicle can be positioned alongside an asphalt paving machine that is laying an asphalt mat and rapidly discharge asphalt paving material into the hopper of the paving machine as the material transfer vehicle moves with the paving machine along the roadway. Furthermore, these discharge conveyors are configured so that their discharge end may be raised and lowered to position the discharge outlet advantageously with respect to the asphalt receiving hopper of a paving machine. The moveable nature of these discharge conveyors allows for some flexibility in locating the material transfer vehicle adjacent to the asphalt paving machine. Because of its rapid loading and unloading capabilities, a self-propelled material transfer vehicle equipped with a surge bin can rapidly shuttle between delivery trucks or windrows at a pick-up point and an asphalt paving machine that is laying an asphalt mat at a paving site so that there is less likelihood that the paving machine will have to stop paving because of a lack of asphalt paving material.

Other types of material transfer vehicles, such as the Cedarapids MS2 and the Cedarapids MS5, are not self-propelled, but are adapted to be tethered to an asphalt paving machine. These machines may have windrow pick-up heads that are adapted to pick up a windrow of asphalt paving material that has been dumped on the roadway as the machine is moved into the windrow. These machines also include a loading conveyor that that is attached to the windrow pick-up head to carry the asphalt paving material up to a chute that is positioned over the asphalt receiving hopper of the asphalt paving machine.

Some of the self-propelled material transfer vehicles, such as the Roadtec SB-1500 and the Roadtec SB-2500, can alternatively be provided with either a truck-receiving hopper or a windrow pick-up head. However, these machines cannot be converted between a configuration that is equipped with a truck-receiving hopper and a configuration that is equipped with a windrow pick-up head.

When a self-propelled material transfer vehicle is used in an asphalt paving process, a delivery truck can be stopped a significant distance away from the paving machine in order to unload its load from a stopped position into the material transfer vehicle or onto the roadway. Thus, the delivery truck can unload faster when not unloading directly into the paving machine, and the unloading location may be selected so that there is no danger of the raised dump bed of the truck hitting power lines or tree limbs on the side of the roadway. The use of a material transfer vehicle also reduces the need for delivery trucks to queue up at the paving machine in order to keep it moving, thereby cutting the waiting time of the delivery trucks and thereby reducing truck operating costs.

Even though material transfer vehicles are quite versatile, it would be desirable if a material transfer vehicle could be easily adapted to receive asphalt paving material in a truck-receiving hopper or from a windrow pick-up head.

Advantages of the Invention

Among the advantages of the invention is that it provides a material transfer vehicle that can be alternatively configured to employ a truck-receiving hopper and a windrow pick-up head. Other advantages and features of this invention will become apparent from an examination of the drawings and the ensuing description.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships. The terms "operatively attached" and "operatively connected" describe such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

Several terms are specifically defined herein. These terms are to be given their broadest reasonable construction consistent with such definitions, as follows:

The term "asphalt paving material" refers to a bituminous paving mixture that is comprised of asphalt cement and crushed stone, recycled asphalt shingles, recycled asphalt pavement materials and/or other aggregate materials of varying particle size, and which is used for paving purposes.

The terms "asphalt paving machine", "paving machine" and "paver" refer to a finishing machine for applying asphalt paving material to form an asphalt mat on a roadway, parking lot or similar surface. An asphalt paving machine or paver is typically a self-propelled vehicle having a hopper at one end for receiving asphalt paving material, a distributing auger for distributing asphalt paving material across the roadway at the other end, and a floating screed located behind the distributing auger for forming an asphalt mat on the roadway. A conveyor is also provided to move asphalt paving material from the hopper to the distributing auger.

The term "asphalt mat" refers to a layer of asphalt paving material such as is applied by an asphalt paving machine to produce a roadway, parking lot or similar surface.

The term "material transfer vehicle" refers to a vehicle that is adapted to receive asphalt paving material from a delivery truck or a windrow and to transfer the asphalt paving material to the receiving hopper of an asphalt paving machine.

SUMMARY OF THE INVENTION

The invention comprises a material transfer vehicle having a loading conveyor to which a loading component may be removably attached. The loading component may be a truck-receiving hopper component or a windrow pick-up component, each of which is adapted to be removably and interchangeably attached to the lower end of the loading conveyor.

Preferably, the loading conveyor of the material transfer vehicle includes an integral transverse auger at its lower end. Outside the transverse auger at the lower end of this embodiment of the loading conveyor are located a right guide plate and a left guide plate. Each loading component includes right and left guide brackets. When the preferred loading component is placed on the roadway surface, and the loading conveyor of the material transfer vehicle is aligned with the rear end of the applicable loading component, the material transfer vehicle may be driven, pushed or otherwise guided towards the rear end of the loading component, so that the right and left guide plates on the lower end of the loading conveyor will align with and engage the right and left guide brackets on the loading component. Suitable holes are provided in the lower end of the loading conveyor and the sides of the truck-receiving hopper component and the windrow pick-up component so that fasteners may be used to affix the selected loading component to the lower end of the loading conveyor.

In order to facilitate an understanding of the invention, the preferred embodiment of the invention, as well as the best mode known by the inventors for carrying out the invention, is illustrated in the drawings, and a detailed description thereof follows. It is not intended, however, that the invention be limited to the particular embodiment described or to use in connection with the apparatus illustrated herein. Therefore, the scope of the invention contemplated by the inventors includes all equivalents of the subject matter described and claimed herein, as well as various modifications and alternative embodiments such as would ordinarily occur to one skilled in the art to which the invention relates. The inventors expect skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiment of the invention is illustrated in the accompanying drawings, in which like reference numerals represent like parts throughout, and wherein:

FIG. 1 also illustrates a delivery truck and a conventional asphalt paving machine that may be employed in paving a roadway.

DESCRIPTION OF THE PREFERRED EMBODIMENTS OF THE INVENTION

Figure 1:
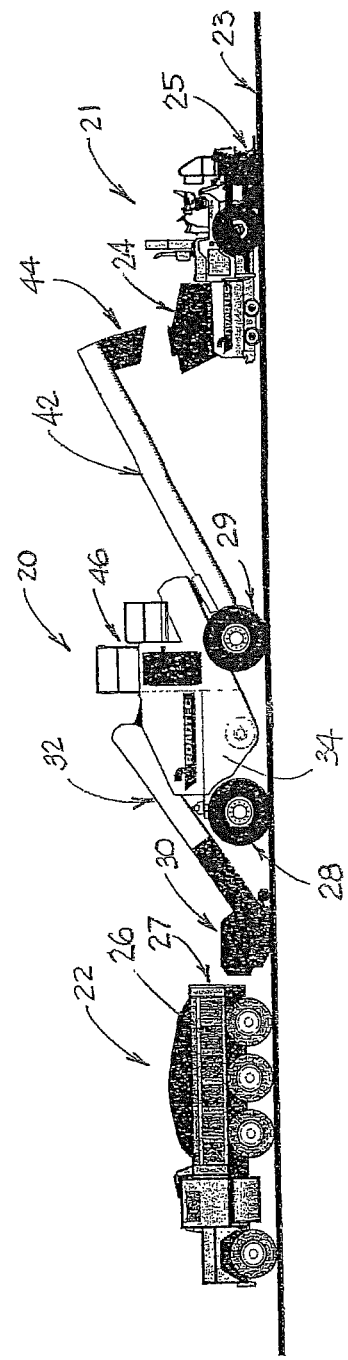
FIG. 1 is a side view of a first embodiment of a conventional material transfer vehicle of a type that may accommodate the invention. This conventional material transfer vehicle has a truck-receiving hopper that is adapted to receive asphalt paving material from a conventional delivery truck.

This description of preferred embodiments of the invention is intended to be read in connection with the accompanying drawings, which are to be considered part of the entire written description of this invention. The drawing figures are not necessarily to scale, and certain features of the invention may be shown exaggerated in scale or in somewhat schematic form in the interest of clarity and conciseness.

As shown in FIG. 1, a conventional self-propelled material transfer vehicle 20 is positioned adjacent to and between conventional asphalt paving machine 21 and conventional asphalt supply delivery truck 22. Paving machine 21 may be operated to pave roadway 23 in a direction from right to left, as shown in FIG. 1. Paving machine 21 includes asphalt receiving hopper 24 at its front end and floating screed 25 at its rear end. Paving machine 21 also includes a conventional conveyor system comprising a longitudinally disposed conveyor (not shown) for delivering the asphalt paving material to a transversely disposed distributing auger (also not shown), which deposits the asphalt paving material onto the roadway surface in front of floating screed 25.

Conventional delivery truck 22 includes a pivotally mounted bed 26 with a tailgate 27, and is adapted to deliver asphalt paving material from a remote source to material transfer vehicle 20. Preferably, the delivery truck delivers the asphalt paving material directly to the material transfer vehicle or in a windrow on the roadway at a convenient location remote from the paving machine, and then the material transfer vehicle transports the asphalt paving material to the paving location for discharge into paving machine hopper 24. Thus, material transfer vehicle 20 is adapted to shuttle between asphalt supply trucks at an asphalt-receiving location and a paving machine that is engaged in paving a roadway.

Figure 2:
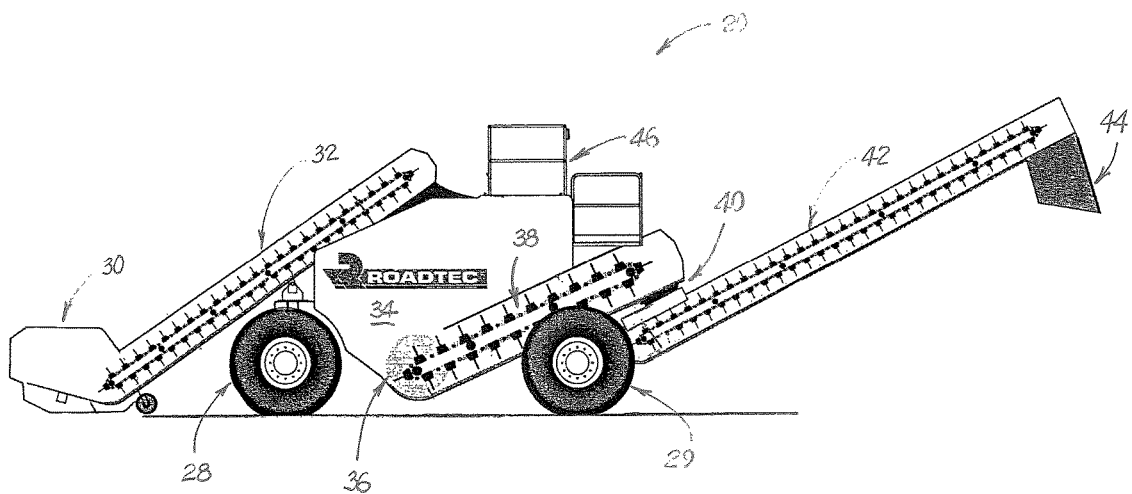
FIG. 2 is a side view of the material transfer vehicle shown in FIG. 1.
Figure 3:
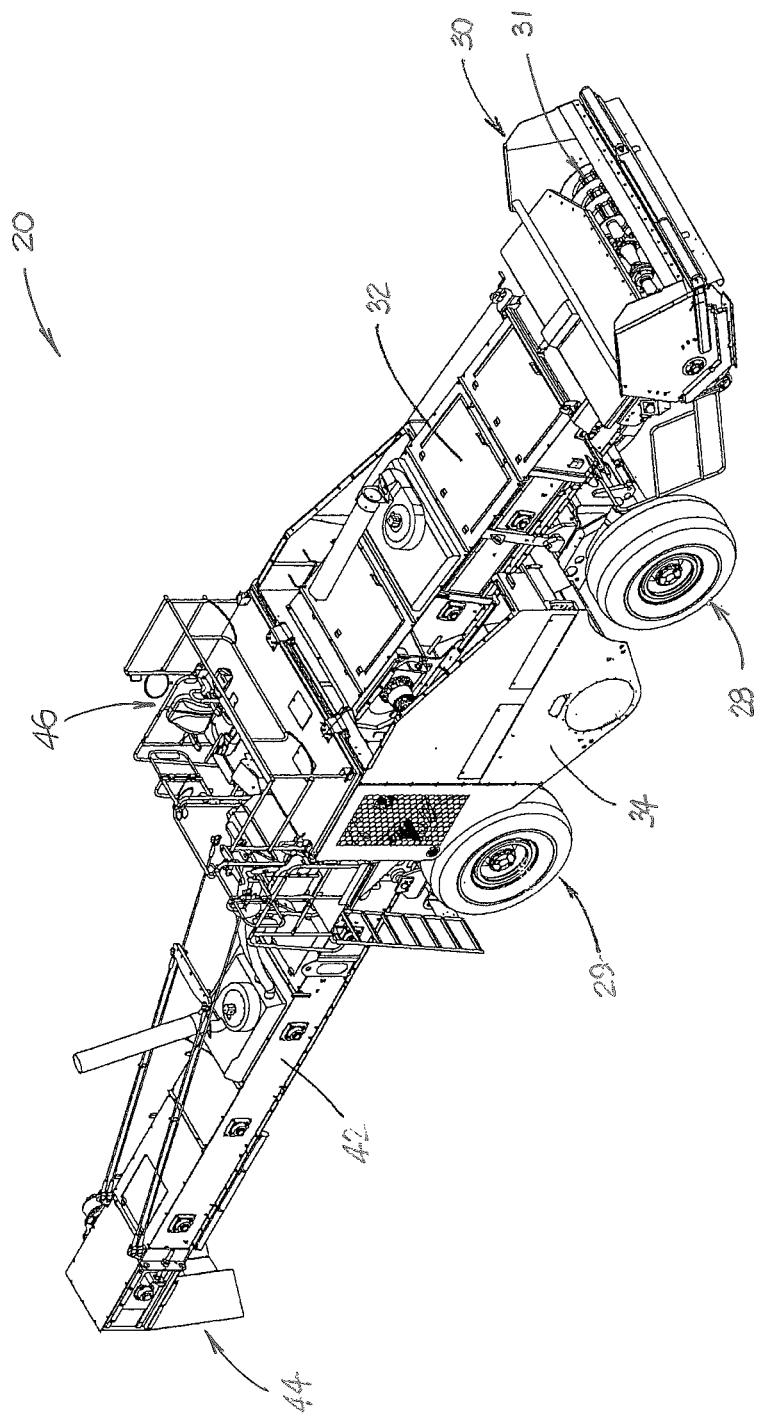
FIG. 3 is a perspective view of the material transfer vehicle shown in FIGS. 1 and 2.

Material transfer vehicle 20 (also shown in FIGS. 2 and 3) includes a frame that is supported on the roadway surface by first wheel set 28 and second wheel set 29. Each of the wheel sets is driven by a hydraulic motor (not shown) that is supplied with fluid under pressure by one or more hydraulic pumps (also not shown). Vehicle 20 includes truck-receiving hopper 30 for receiving asphalt paving material from delivery truck 22 (in the embodiment of use shown in FIG. 1). Auger 31 (shown in FIG. 3) is mounted in truck-receiving hopper 30 and is adapted to assist in conveying asphalt paving material from truck-receiving hopper 30 into loading conveyor 32, which in turn conveys the asphalt paving material to surge bin 34. The surge bin includes transverse auger 36 (shown in FIG. 2) that is employed to mix the asphalt paving material in the surge bin in order to minimize segregation or separation of the aggregate portion of the asphalt paving material by size. Also located in the surge bin is surge conveyor 38, which is adapted to convey asphalt paving material out of the surge bin to chute 40 which is associated with paver-loading conveyor 42. Asphalt paving material conveyed out of the surge bin by surge conveyor 38 falls through chute 40 and onto paver-loading conveyor 42. Paver-loading conveyor 42 is mounted for vertical pivotal movement about a pivot at its entry end as raised and lowered by a linear actuator (not shown). Conveyor 42 is also adapted for side-to-side movement about a vertical axis by operation of one or more additional actuators (also not shown). Asphalt paving material that falls through chute 40 onto paver-loading conveyor 42 is discharged through chute 44 into asphalt receiving hopper 24 of asphalt paving machine 21 (in the embodiment of use shown in FIG. 1). Hydraulic drive systems including hydraulic pumps and hydraulic motors are provided to drive transverse auger 36 and the various conveyors, and an engine (not shown) provides the motive force for the hydraulic pumps that drive the hydraulic motors for the wheel sets, the transverse auger and the various conveyors and other components of the vehicle. Vehicle 20 is operated by an operator located at operator station 46.

Figure 4:
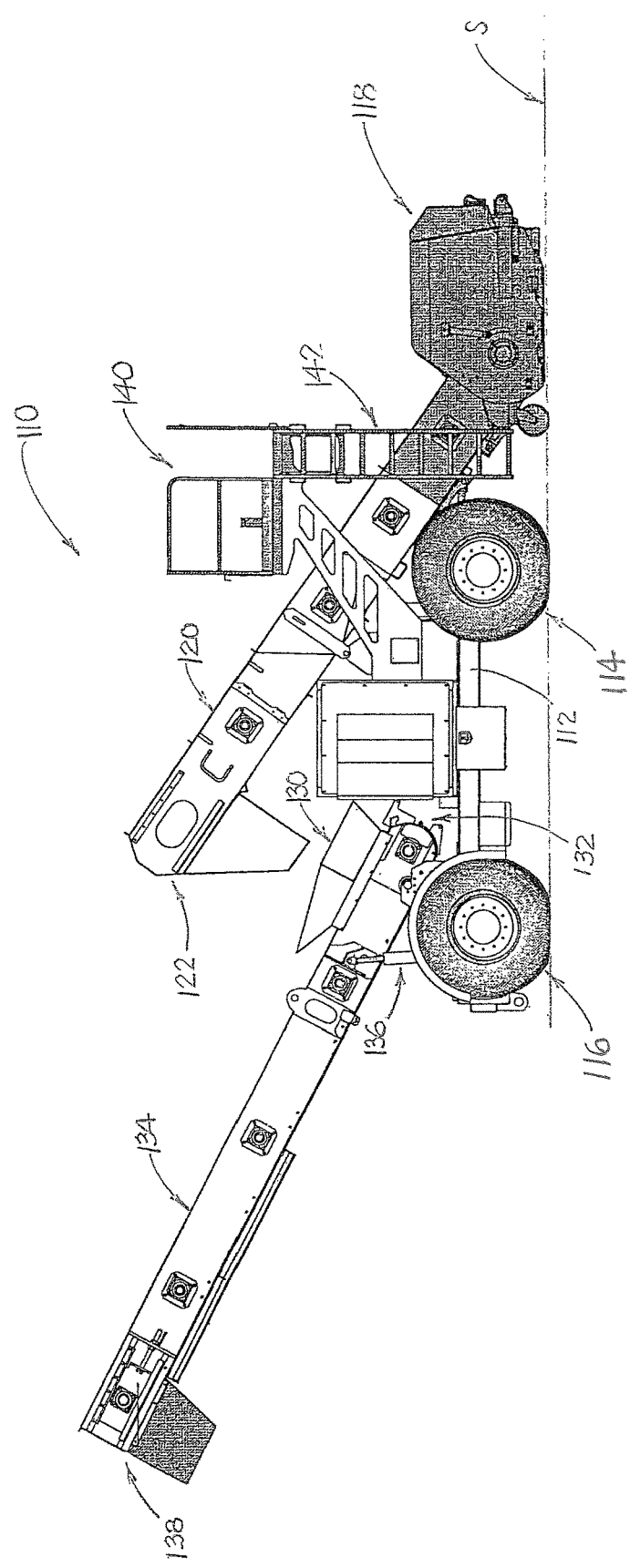
FIG. 4 is a side view of a second embodiment of a material transfer vehicle of a type that may accommodate the invention.

FIG. 4 illustrates an alternative conventional material transfer vehicle 110 which includes frame 112 that is supported on the roadway surface "S" by first wheel set 114 and second wheel set 116. Each of the wheel sets is driven by a hydraulic motor (not shown) that is supplied with fluid under pressure by one or more hydraulic pumps (also not shown). Vehicle 110 includes truck-receiving hopper 118 for receiving asphalt paving material from a delivery truck (not shown, but substantially similar to truck 22 of FIG. 1). An auger (not shown, but substantially similar to auger 31 of material transfer vehicle 20) in truck-receiving hopper 118 is adapted to urge asphalt paving material into loading conveyor 120. Loading conveyor 120 is operatively attached to the truck-receiving hopper and is adapted to convey asphalt paving material from truck-receiving hopper 118 upwardly to its output end 122. Asphalt paving material is carried upwardly on loading conveyor 120 to its elevated output end 122, from which it will fall into chute 130 on lower input end 132 of discharge conveyor 134. Discharge conveyor 134 is mounted for pivotal movement about a horizontal pivot axis at lower input end 132 by means of one or more linear actuators including actuator 136 so that output end 138 of discharge conveyor 134 may be raised and lowered. Discharge conveyor 134 is also adapted for side-to-side movement about a vertical pivot axis by operation of one or more additional actuators (not shown). Asphalt paving material that falls into chute 130 on discharge conveyor 134 is carried upwardly to output end 138 of discharge conveyor 134, from which it will fall into the hopper of an asphalt paving machine (not shown). Material transfer vehicle 110 also includes operator's platform 140 from which all operating functions of the vehicle may be controlled. Operator's platform 140 is accessed by conventional vertical ladder 142. Material transfer vehicle 110 includes various hydraulic pumps and hydraulic motors, which are provided to drive the transverse auger in loading conveyor 120 and the various conveyors, and an engine (not shown) provides the motive force for the hydraulic pumps that drive the hydraulic motors for the wheel sets, the transverse auger and the various conveyors and other components of the vehicle.

Figure 5:
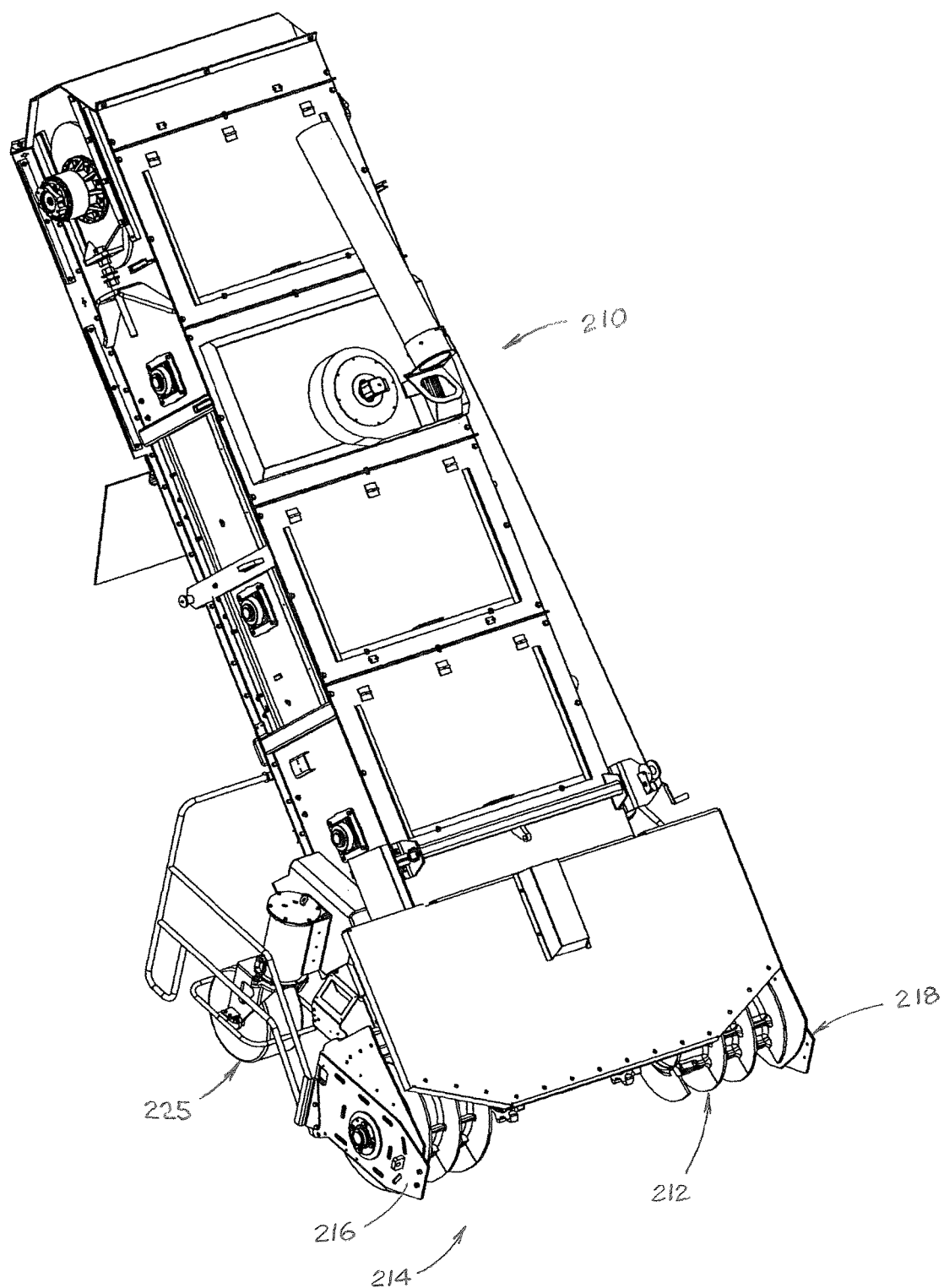
FIG. 5 is a perspective view of a loading conveyor of a material transfer vehicle that has been configured according to a preferred embodiment of the invention to receive a removable and interchangeable loading component.
Figure 6:
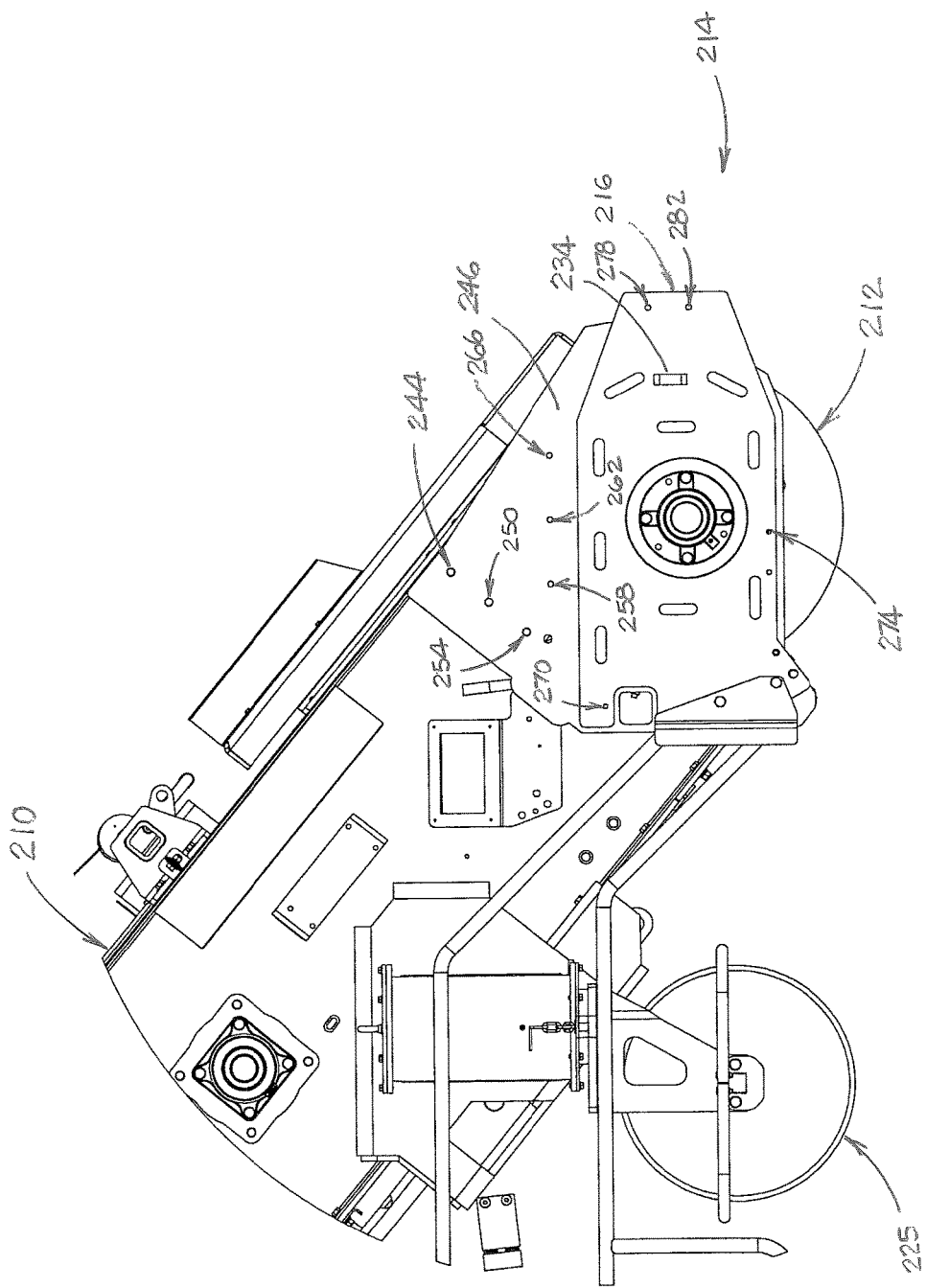
FIG. 6 is a side view of the lower portion of the loading conveyor shown in FIG. 5.

FIGS. 5-9 illustrate preferred embodiments of the invention. As shown therein, loading conveyor 210 of a material transfer vehicle includes integral transverse auger 212 at its lower end 214. Outside the transverse auger at lower end 214 are right guide plate 216 and left guide plate 218, which are mirror images of each other. Preferably, as shown in FIGS. 5 and 6, right guide plate 216 supports the right end of transverse auger 212 and left guide plate 218 supports the left end of transverse auger 212. A loading component comprising truck-receiving hopper component 219 (shown in FIG. 7) or windrow pick-up component 220 (shown in FIG. 8) is adapted to be removably attached to lower end 214 of loading conveyor 210. Truck-receiving hopper component 219 has right sidewall 221 and left sidewall 222 that together define a width "W" for truck-receiving hopper component 219. Similarly, windrow pick-up component 220 has right sidewall 223 and left sidewall 224 that together define a width "W" for the windrow pick-up component that is the same as width "W" for the truck-receiving hopper component.

When a loading component such as truck-receiving hopper component 219 or windrow pick-up component 220 is placed on the ground, and loading conveyor 210 of a material transfer vehicle is lowered so that right and left caster wheels (one of which, right caster wheel 225, is shown in the drawings) will roll along the ground, the material transfer vehicle may be driven, pushed or otherwise guided towards rear end 226 of truck-receiving hopper component 219 or rear end 228 of windrow pick-up component 220. Truck-receiving hopper component 219 includes right guide bracket 230 that is attached to right sidewall 221 and a left guide bracket (not shown) that is attached to left sidewall 222 and is located opposite to and is a mirror image of right guide bracket 230. Similarly, windrow pick-up component 220 includes right guide bracket 232 that is attached to right sidewall 223 and a left guide bracket (not shown) that is attached to left sidewall 224 and is located opposite to and is a mirror image of right guide bracket 232. Right guide brackets 230 and 232 are essentially identical, and the left guide bracket of truck-receiving hopper component 219 is essentially identical to the left guide bracket of windrow pick-up component 220. Consequently, when truck-receiving hopper component 219 is properly aligned with lower end 214 of loading conveyor 210 and the material transfer vehicle is moved towards the truck-receiving hopper component, right guide plate 216 will align with and engage right guide bracket 230 and left guide plate 218 will align with and engage the left guide bracket located opposite right guide bracket 230. Similarly, when windrow pick-up component 220 is properly aligned with lower end 214 of loading conveyor 210 and the material transfer vehicle is moved towards the windrow pick-up component, right guide plate 216 will align with and engage right guide bracket 232 and left guide plate 218 will align with and engage the left guide bracket located opposite right guide bracket 232.

Figure 7:
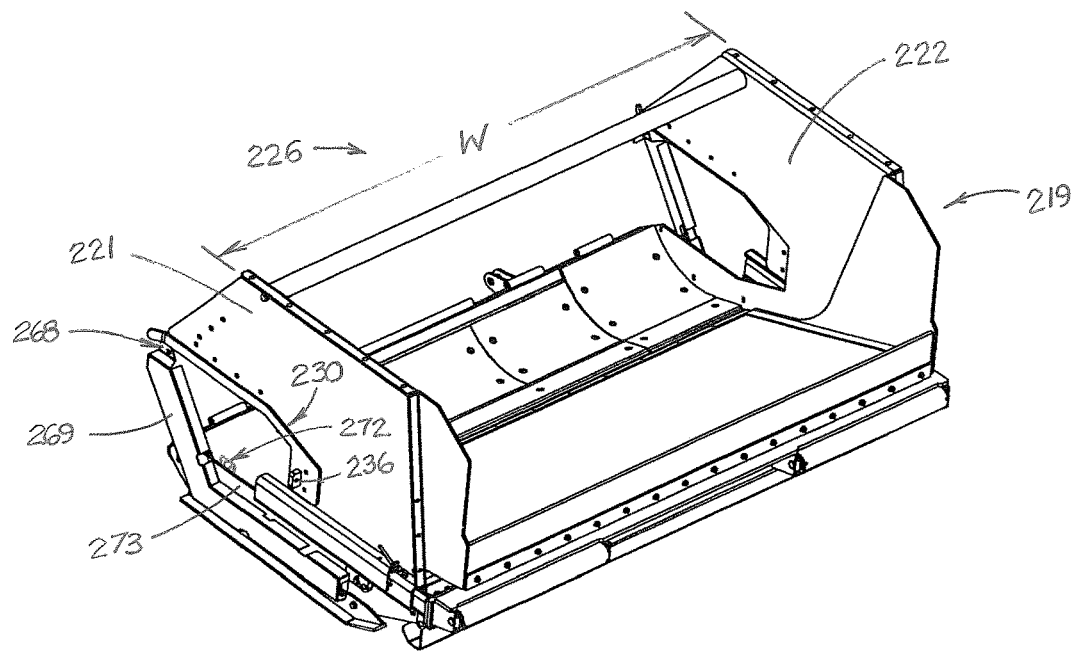
FIG. 7 is a perspective view of a preferred embodiment of a loading component comprising a truck-receiving hopper component that can be mated with the loading conveyor shown in FIGS. 5 and 6 according to the invention.
Figure 8:
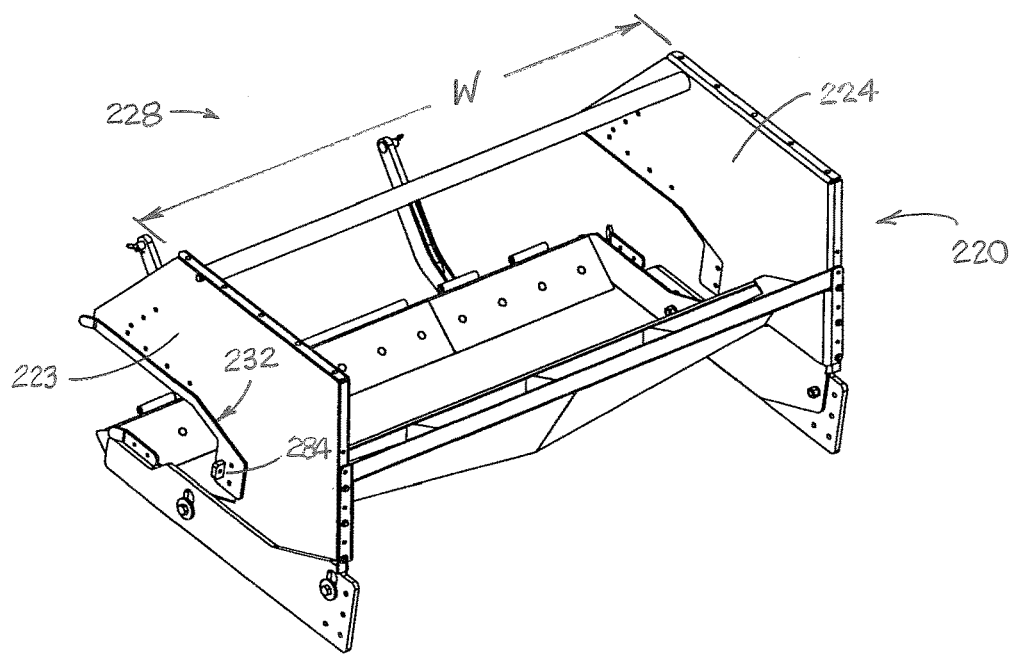
FIG. 8 is a perspective view of a preferred embodiment of a loading component comprising a windrow pick-up component that can be mated with the loading conveyor shown in FIGS. 5 and 6 according to the invention.
Figure 9:
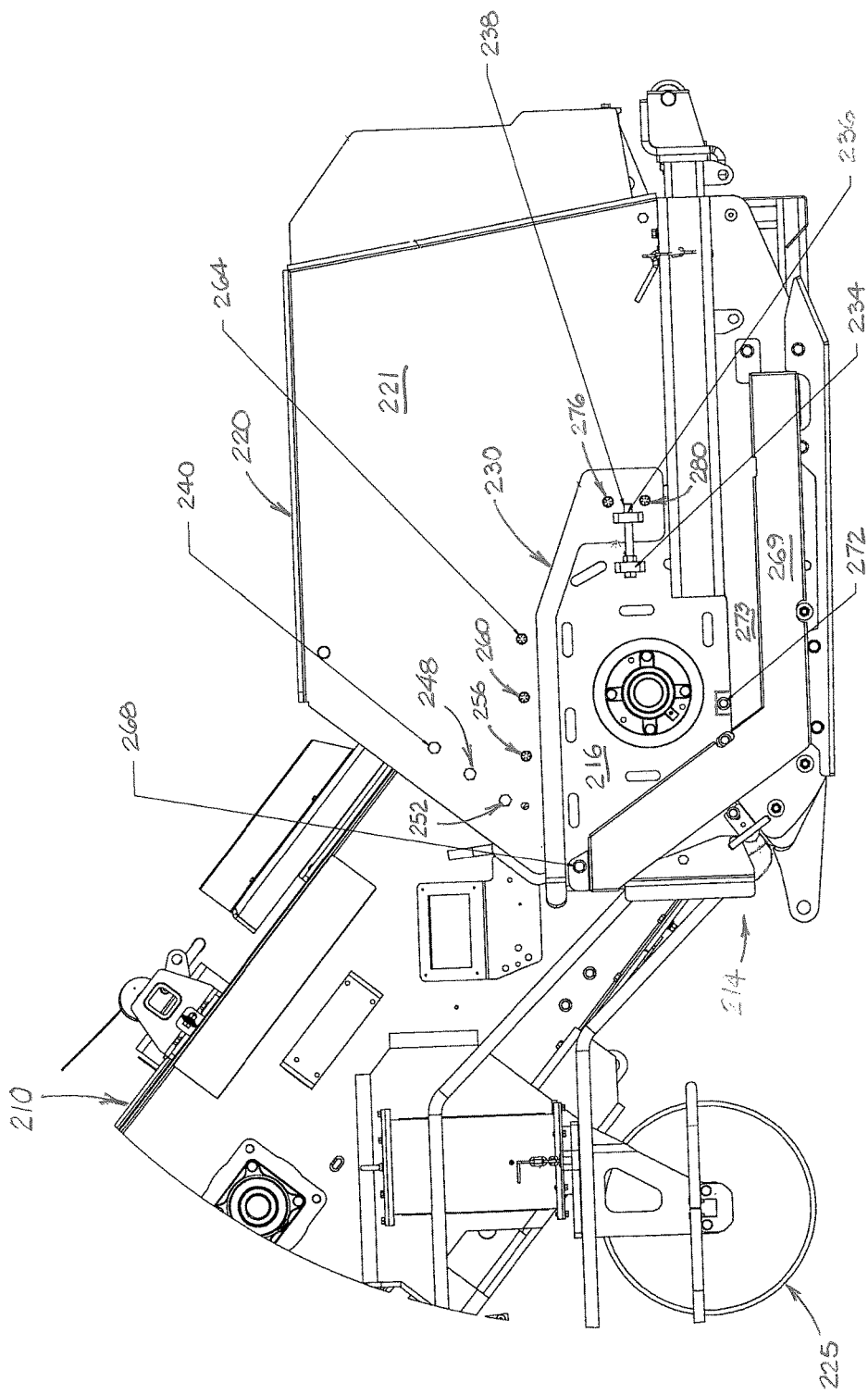
FIG. 9 is a side view of a combination, according to the invention, of the truck-receiving hopper component shown in FIG. 7 and the loading conveyor shown in FIGS. 5 and 6.

FIGS. 6, 7 and 9 illustrate the attachment of the loading component comprising truck-receiving hopper component 219 to lower end 214 of loading conveyor 210. As shown therein, right guide plate 216 on the right side of the lower end 214 of loading conveyor 210 includes right alignment bracket 234 that aligns with right alignment tab 236 on right guide bracket 230 of truck-receiving hopper component 219. A similarly located left alignment bracket (not shown, but substantially similar to right alignment bracket 234) is located on left guide plate 218 and is adapted to align with a left alignment tab (not shown, but substantially similar to right alignment tab 236) on the left guide bracket of truck-receiving hopper component 219 that is located opposite right guide bracket 232. Preferably, the holes in right alignment tab 236 and the left alignment tab are threaded so that fasteners such as fastener 238 may be threaded into right alignment tab 236 and the left alignment tab and placed through the holes in right alignment bracket 234 and the left alignment bracket and tightened to move truck-receiving hopper component 220 with respect to loading conveyor 210 until various fastener holes in the components are aligned to receive fasteners. Thus, hole 240 in right sidewall 221 of the truck-receiving hopper component is adapted to align with hole 244 in right sidewall 246 of lower end 214 of loading conveyor 210, and hole 248 in right sidewall 221 of the truck-receiving hopper component is adapted to align with hole 250 in right sidewall 246 of lower end 214 of loading conveyor 210. Hole 252 in right sidewall 221 of the truck-receiving hopper component is adapted to align with hole 254 in right sidewall 246 of lower end 214 of loading conveyor 210. Similarly, hole 256 in right sidewall 221 of the truck-receiving hopper component is adapted to align with hole 258 in right sidewall 246 of lower end 214 of loading conveyor 210, and hole 260 in right sidewall 221 of the truck-receiving hopper component is adapted to align with hole 262 in right sidewall 246 of lower end 214 of loading conveyor 210. Hole 264 in right sidewall 221 of the truck-receiving hopper component is adapted to align with hole 266 in right sidewall 246 of lower end 214 of loading conveyor 210. Hole 268 in right lower arm 269 of truck-receiving hopper component 219 is adapted to align with hole 270 in right guide plate 216, and hole 272 on right lower sidewall 273 of truck-receiving hopper component 219 is adapted to align with hole 274 in right guide plate 216. Hole 276 in right guide bracket 230 is adapted to align with hole 278 in right guide plate 216, and hole 280 in right guide bracket 230 is adapted to align with hole 282 in right guide plate 216. When all of these holes are aligned, suitable fasteners are applied to affix the right side of the truck-receiving hopper component to the right side of the lower end 214 of loading conveyor 210.

Similarly spaced holes on the left side of the truck-receiving hopper component are adapted to be aligned with holes on the left side of the lower end 214 of loading conveyor 210, and when all of these holes are aligned, suitable fasteners are applied to affix the left side of the truck-receiving hopper component to the left side of the lower end 214 of loading conveyor 210.

A similar configuration of brackets and holes are provided on the sides of the loading component comprising windrow pick-up component 220. Thus, right guide plate 216 includes right alignment bracket 234 that aligns with right alignment tab 284 on right guide bracket 232 of the windrow pick-up component. The left alignment bracket (not shown, but substantially similar to right alignment bracket 234) on left guide plate 218 is adapted to align with a left alignment tab (not shown, but substantially similar to right alignment tab 284) on the left guide bracket of windrow pick-up component 220 that is located opposite right guide bracket 232. Preferably, the holes in right alignment tab 284 and the left alignment tab are threaded so that fasteners such as fastener 238 may be threaded into right alignment tab 284 and the left alignment tab and placed through the holes in right alignment bracket 234 and the left alignment bracket and tightened to move windrow pick-up component 220 with respect to loading conveyor 210 until various fastener holes in the components are aligned to receive fasteners. When the holes are properly aligned, fasteners can be applied to affix the windrow pick-up component to the lower end 214 of loading conveyor 210. The fastener holes in the windrow pick-up component are similarly located as are the holes in the truck-receiving hopper component so that the two components can be interchangeably attached to lower end 214 of loading conveyor 210.

The invention thus provides a loading component such as a truck-receiving hopper component or a windrow pick-up component that is adapted to be removably attached to the lower end of the loading conveyor of a material transfer vehicle using common fasteners and simple tools. The preferred loading conveyor includes a transverse auger at its lower end, a right guide plate outside the right side of the transverse auger, and a left guide plate outside the left side of the transverse auger. The preferred loading component includes a right guide bracket that is adapted to align with and engage the right guide plate of the loading conveyor, and a left guide bracket that is adapted to align with and engage the left guide plate of the loading conveyor.

Although this description contains many specifics, these should not be construed as limiting the scope of the invention but as merely providing illustrations of the presently preferred embodiment thereof, as well as the best mode contemplated by the inventors of carrying out the invention. The invention, as described and claimed herein, is susceptible to various modifications and adaptations, as would be understood by those having ordinary skill in the art to which the invention relates.

What is claimed is:

1. A material transfer vehicle comprising:
   (a) a loading conveyor including:
      (i) a lower end with a right side and a left side;
      (ii) a transverse auger at the lower end of the loading conveyor, said transverse auger having a right end and a left end;
      (iii) a right guide plate on the right side of the lower end, said right guide plate supporting the right end of the transverse auger;
      (iv) a left guide plate on the left side of the lower end, said left guide plate supporting the left end of the transverse auger;
   (b) a loading component that is adapted to be removably attached to the lower end of the loading conveyor, said loading component including:
      (i) a right guide bracket that is adapted to align with and engage the right guide plate of the loading conveyor;
      (ii) a left guide bracket that is adapted to align with and engage the left guide plate of the loading conveyor.

2. The material transfer vehicle of claim 1 wherein the loading component is selected from the group consisting of a truck-receiving hopper component and a windrow pick-up component.

3. The material transfer vehicle of claim 1:
   (a) wherein the lower end of the loading conveyor has a left sidewall with a left fastener hole therein;
   (b) wherein the lower end of the loading conveyor has a right sidewall with a right fastener hole therein;
   (c) wherein the loading component has a left side with a left fastener hole therein that is adapted to be aligned with the left fastener hole in the left sidewall of the lower end of the loading conveyor;
   (d) wherein the loading component has a right side with a right fastener hole therein that is adapted to be aligned with the right fastener hole in the right sidewall of the lower end of the loading conveyor.

4. The material transfer vehicle of claim 1:
   (a) wherein the lower end of the loading conveyor has a left sidewall with a plurality of left fastener holes therein;
   (b) wherein the lower end of the loading conveyor has a right sidewall with a plurality of right fastener holes therein;
   (c) wherein the loading component has a left side with a plurality of left fastener holes therein, each of which is adapted to be aligned with one of the plurality of left fastener holes in the left sidewall of the lower end of the loading conveyor;
   (d) wherein the loading component has a right side with a plurality right fastener holes therein, each of which is adapted to be aligned with one of the plurality of right fastener holes in the right sidewall of the lower end of the loading conveyor.

5. The material transfer vehicle of claim 1 which includes:
   (a) a right side wheel on the right side of the lower end of the loading conveyor, said right side wheel being adapted to roll along a roadway surface; and
   (b) a left side wheel on the left side of the lower end of the loading conveyor, said left side wheel being adapted to roll along the roadway surface.

6. A material transfer vehicle comprising:
   a loading conveyor including a lower end with a right side and a left side and further comprising:
      (i) a right guide plate on the right side of the lower end, said right guide plate including a right alignment bracket having a right alignment bracket fastener hole;
      (ii) a right sidewall adjacent the right guide plate, said right sidewall including a loading conveyor fastener hole;
      (iii) a left guide plate on the left side of the lower end, said left guide plate including a left alignment bracket having a left alignment bracket fastener hole;
      (iv) a left sidewall adjacent the left guide plate, said left sidewall including a loading conveyor fastener hole;
   (b) a loading component that is adapted to be removably attached to the lower end of the loading conveyor, said loading component including:
      (i) a right sidewall including a loading component fastener hole;
      (ii) a right guide bracket that is adjacent to the right sidewall, said right guide bracket being adapted to align with and engage the right guide plate of the loading conveyor, said right guide bracket including a right alignment tab having a right alignment tab fastener hole, said right alignment tab being adapted to align with the right alignment bracket on the right guide plate of the loading conveyor so that a right side fastener may be connected between the right alignment bracket fastener hole on the right alignment bracket and the right alignment tab fastener hole and tightened to move the loading component with respect to the lower end of the loading conveyor until the fastener hole in the right sidewall of the lower end of the loading conveyor is aligned with the loading component fastener hole in the right sidewall of the loading component;
      (iii) a left sidewall including a loading component fastener hole;
      (iv) a left guide bracket that is adjacent to the left sidewall, said left guide bracket being adapted to align with and engage the left guide plate of the loading conveyor, said left guide bracket including a left alignment tab having a left alignment tab fastener hole, said left alignment tab being adapted to align with the left alignment bracket on the left guide plate of the loading conveyor so that a left side fastener may be connected between the left alignment bracket fastener hole on the left alignment bracket and the left alignment tab fastener hole and tightened to move the loading component with respect to the lower end of the loading conveyor until the fastener hole in the left sidewall of the lower end of the loading conveyor is aligned with the loading component fastener hole in the left sidewall of the loading component.

7. The material transfer vehicle of claim 6 wherein the right alignment tab fastener hole and the left alignment tab fastener hole are threaded so that:
   (a) the right side fastener may be threaded into the right alignment tab and placed through the hole in the right alignment bracket; and
   (b) the left side fastener may be threaded into the left alignment tab and placed through the hole in the left alignment bracket; and
   (c) the right side fastener and the left side fastener may be tightened to move the loading component with respect to the loading conveyor until the fastener hole in the right sidewall of the lower end of the loading conveyor is aligned with the loading component fastener hole in the right side of the loading component and the fastener hole in the left sidewall of the lower end of the loading conveyor is aligned with the loading component fastener hole in the left sidewall of the loading component.

8. A method for removably attaching a loading component to a loading conveyor of a material transfer vehicle, said method comprising:
(a) providing the loading conveyor with:
  (i) a lower end with a right side and a left side;
  (ii) a right guide plate on the right side of the lower end;
  (iii) a left guide plate on the left side of the lower end;
  (iv) a right side wheel on the right side of the lower end; and
  (v) a left side wheel on the left side of the lower end;
(b) providing the loading component with:
  (i) a right guide bracket that is adapted to align with and engage the right guide plate of the loading conveyor;
  (ii) a left guide bracket that is adapted to align with and engage the left guide plate of the loading conveyor;
(c) positioning the loading conveyor of the material transfer vehicle with respect to the loading component so that:
  (i) the right guide plate on the right side of the lower end of the loading conveyor is aligned with the right guide bracket of the loading component; and
  (ii) the left guide plate on the left side of the lower end of the loading conveyor is aligned with the left guide bracket of the loading component;
(d) moving the loading conveyor of the material transfer vehicle towards the loading component until:
  (i) the right guide bracket on the loading component engages the right guide plate of the loading conveyor; and
  (ii) the left guide bracket on the loading component engages the left guide plate of the loading conveyor.

9. The method of claim 8 which includes:
(a) providing a left sidewall with a left fastener hole in the lower end of the loading conveyor;
(b) providing a right sidewall with a right fastener hole in the lower end of the loading conveyor;
(c) providing a left side with a left fastener hole in the loading component, which left fastener hole is adapted to be aligned with the left fastener hole in the left sidewall of the lower end of the loading conveyor;
(d) providing a left fastener;
(e) placing the left fastener into the left fastener hole in the loading component when it is aligned with the left fastener hole in the left sidewall of the lower end of the loading conveyor;
(f) providing a right side with a right fastener hole in the loading component, which right fastener hole is adapted to be aligned with the right fastener hole in the right sidewall of the lower end of the loading conveyor;
(g) providing a right fastener;
(h) placing the right fastener into the right fastener hole in the loading component when it is aligned with the right fastener hole in the right sidewall of the lower end of the loading conveyor.

10. The method of claim 8 which includes:
(a) providing a left sidewall with a plurality of left fastener holes in the lower end of the loading conveyor;
(b) providing a right sidewall with a plurality of right fastener holes in the lower end of the loading conveyor;
(c) providing a left side with a plurality of left fastener holes in the loading component, each of which left fastener holes is adapted to be aligned with one of the plurality of left fastener holes in the left sidewall of the lower end of the loading conveyor;
(d) providing a left fastener;
(e) placing the left fastener into one of the plurality of left fastener holes in the loading component when aligned with one of the plurality of left fastener holes in the left sidewall of the lower end of the loading conveyor;
(f) providing a right side with a plurality of right fastener holes in the loading component, each of which right fastener holes is adapted to be aligned with one of the plurality of right fastener holes in the right sidewall of the lower end of the loading conveyor;
(g) providing a right fastener;
(h) placing the right fastener into one of the plurality of right fastener holes in the loading component when aligned with one of the right fastener holes in the right sidewall of the lower end of the loading conveyor.

11. The method of claim 8 which includes:
(a) providing a right alignment bracket having a right alignment bracket fastener hole on the right guide plate on the right side of the lower end of the loading conveyor;
(b) providing the loading conveyor with a right sidewall adjacent the right guide plate, said right sidewall including a loading conveyor fastener hole;
(c) providing the loading component with a right sidewall adjacent the right guide bracket, said right sidewall including a loading component fastener hole;
(d) providing a right fastener;
(e) providing a right alignment tab in the right guide bracket of the loading component, said right alignment tab:
  (i) having a right alignment tab fastener hole;
  (ii) being adapted to align with the right alignment bracket on the right guide plate of the loading conveyor so that a right side fastener may be connected between the right alignment bracket fastener hole on the right alignment bracket and the right alignment tab fastener hole and tightened to move the loading component with respect to the lower end of the loading conveyor until the fastener hole in the right sidewall of the lower end of the loading conveyor is aligned with the loading component fastener hole in the right sidewall of the loading component;
(f) providing a right side fastener;
(g) providing a left alignment bracket having a left alignment bracket fastener hole on the left guide plate on the left side of the lower end of the loading conveyor;
(h) providing the loading conveyor with a left sidewall adjacent the left guide plate, said left sidewall including a loading conveyor fastener hole;
(i) providing a left fastener;
(j) providing the loading component with a left sidewall adjacent the left guide bracket, said left sidewall including a loading component fastener hole;
(k) providing the left guide bracket of the loading component with a left alignment tab having a left alignment tab fastener hole, said left alignment tab being adapted to align with the left alignment bracket on the left guide plate of the loading conveyor so that a left side fastener may be connected between the left alignment bracket fastener hole on the left alignment bracket and the left alignment tab fastener hole and tightened to move the loading component with respect to the lower end of the loading conveyor until the fastener hole in the left sidewall of the lower end of the loading conveyor is aligned with the loading component fastener hole in the left sidewall of the loading component;

(l) providing a left side fastener;

(m) positioning the loading conveyor of the material transfer vehicle with respect to the loading component so that:
  (i) the right guide plate on the right side of the lower end of the loading conveyor is aligned with the right guide bracket of the loading component; and
  (ii) the left guide plate on the left side of the lower end of the loading conveyor is aligned with the left guide bracket of the loading component;

(n) moving the loading conveyor of the material transfer vehicle towards the loading component until:
  (i) the right guide bracket on the loading component engages the right guide plate of the loading conveyor; and
  (ii) the left guide bracket on the loading component engages the left guide plate of the loading conveyor;

(o) using the right side fastener to connect the right alignment bracket fastener hole on the right alignment bracket and the right alignment tab fastener hole;

(p) using the left side fastener to connect the left alignment bracket fastener hole on the left alignment bracket and the left alignment tab fastener hole;

(q) tightening the right side fastener to move the loading component with respect to the lower end of the loading conveyor until the fastener hole in the right sidewall of the lower end of the loading conveyor is aligned with the loading component fastener hole in the right sidewall of the loading component;

(r) tightening the left side fastener to move the loading component with respect to the lower end of the loading conveyor until the fastener hole in the left sidewall of the lower end of the loading conveyor is aligned with the loading component fastener hole in the left sidewall of the loading component;

(s) placing the right fastener into the fastener hole in the right sidewall of the lower end of the loading conveyor and into the loading component fastener hole in the right side of the loading component to at least partially secure the loading component to the loading conveyor;

(t) placing the left fastener into the fastener hole in the left sidewall of the lower end of the loading conveyor and into the loading component fastener hole in the left side of the loading component to at least partially secure the loading component to the loading conveyor.

12. The method of claim 11 which includes providing the right alignment tab fastener hole and the left alignment tab fastener hole as threaded holes so that:
  (a) the right side fastener may be threaded into the right alignment tab and placed through the hole in the right alignment bracket; and
  (b) the left side fastener may be threaded into the left alignment tab and placed through the hole in the left alignment bracket; and
  (c) the right side fastener and the left side fastener may be tightened to move the loading component with respect to the loading conveyor until the fastener hole in the right sidewall of the lower end of the loading conveyor is aligned with the loading component fastener hole in the right side of the loading component and the fastener hole in the left sidewall of the lower end of the loading conveyor is aligned with the loading component fastener hole in the left sidewall of the loading component.

* * * * *